US008571576B2

(12) United States Patent
Brandt et al.

(10) Patent No.: US 8,571,576 B2
(45) Date of Patent: Oct. 29, 2013

(54) METHOD OF CONFIGURING FM RADIO TRANSMITTERS IN PORTABLE DEVICES

(75) Inventors: Seemal Brandt, Farnborough (GB); Ralf Brandt, Farnborough (GB)

(73) Assignee: Nokia Corporation, Espoo (FI)

( * ) Notice: Subject to any disclaimer, the term of this patent is extended or adjusted under 35 U.S.C. 154(b) by 44 days.

(21) Appl. No.: 13/509,981

(22) PCT Filed: Nov. 16, 2009

(86) PCT No.: PCT/EP2009/008141
§ 371 (c)(1), (2), (4) Date: May 15, 2012

(87) PCT Pub. No.: WO2011/057656
PCT Pub. Date: May 19, 2011

(65) Prior Publication Data
US 2012/0225669 A1 Sep. 6, 2012

(51) Int. Cl.
*H04W 24/00* (2009.01)
*H04M 3/42* (2006.01)
*H04B 1/18* (2006.01)

(52) U.S. Cl.
USPC .................. 455/456.1; 455/183.2; 455/186.1; 381/3

(58) Field of Classification Search
USPC ............ 455/456.1, 183.2, 417, 414.1, 186.1; 381/3
See application file for complete search history.

(56) References Cited

U.S. PATENT DOCUMENTS

2006/0142027 A1* 6/2006 Krishnamurthi et al. ..... 455/457
2007/0032225 A1* 2/2007 Konicek et al. ............... 455/417
2008/0133791 A1* 6/2008 Hodges et al. .................. 710/33
2008/0233907 A1* 9/2008 Ibrahim et al. ............. 455/183.2
2010/0248742 A1* 9/2010 Song et al. ................. 455/456.1
2010/0323715 A1* 12/2010 Winters ..................... 455/456.1

* cited by examiner

*Primary Examiner* — Opiribo Georgewill
(74) *Attorney, Agent, or Firm* — Locke Lord LLP

(57) ABSTRACT

A processor for a user-portable device, the user-portable device comprising FM transmission circuitry, wherein the processor is configured to obtain a first set of valid geo-specific FM transmission parameters for the current geographical location of the user-portable device based on received global positioning satellite (GPS) data for the current geographical location of the user-portable device; and provide signalling to configure the FM transmission circuitry to use the valid first set of geo-specific FM transmission parameters.

11 Claims, 7 Drawing Sheets

METHOD OF CONFIGURING FM RADIO TRANSMITTERS IN PORTABLE DEVICES

RELATED APPLICATION

This application was originally filed as PCT Application No. PCT/EP2009/008141 filed Nov. 16, 2009.

TECHNICAL FIELD

The present disclosure relates to the field of FM transmitters, associated methods, computer programs and apparatus, and in particular concerns the aspects of use for managing FM transmission settings to comply with regional regulations. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (e.g. telecommunication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Low powered frequency modulation (FM) transmitters are used in some countries for interfacing personal audio devices with radio receivers. The FM transmitter plugs into the headphone jack or proprietary output port of the audio device so that the audio signal can be broadcast over an FM band frequency and received by the radio. One of the main purposes of FM transmitters is to provide a simple and inexpensive means for playing music from an audio device through a car stereo without the need to modify or replace the existing stereo. Nowadays, FM transmitters are being integrated into mobile telephones, personal digital assistants (PDAs), and even laptop computers.

The legal status of unlicensed FM transmission varies around the world. In certain regions it is illegal to transmit on FM frequencies due to the risk of interference with other radio devices. In other regions, however, unlicensed FM transmission is legal provided that local regulations are adhered to. The regulations define technical requirements for FM transmission, but these requirements typically vary from region to region. In Europe and Japan, the maximum output power of an FM transmitter is limited to 50 nW (−43 dBm effective radiated power, ERP), whilst in China and the US, the maximum output is limited to 45 nW (−43.5 dBm) and 250 μV/m@3 m (−47.3 dBm), respectively. Besides output power, the available frequency bands and channel spacing also differ. The available frequency bands are currently 87.6-107.9 MHz in Europe, China and the US, and 76.1-87.5 MHz in Japan, and the channel spacing is 100 kHz in Europe and Japan, and 200 kHz in the US and China.

Manufacturers provide type-approval certificates to demonstrate that an FM transmitter meets the minimum set of regulatory, technical and safety requirements in the country of manufacture, but there is no way for the certification authorities to ensure that local regulations are met when the transmitter is taken from one region to another. As a result, an FM transmitter may be used illegally when the user travels between regions with different transmission requirements. In order to be able to use the same FM transmitter legally in all parts of the world, it is necessary to reconfigure the FM transmission parameters of the FM transmitter according to the region-specific requirements. In some regions, the FM transmitter may even need to be switched off.

At present, one solution involves storing the FM transmission parameters for each region in the device memory and configuring the FM transmitter with the parameters for the current geographical location of the device when FM transmitter is switched on. When the device is moved to a different location, the FM transmitter is then reconfigured with the local parameters to ensure compliance with the requirements of the region in which the device is being used. If certification authorities could certify an FM transmitter for international use, only FM transmitters implementing such dynamic control of parameters would be certified.

In order to determine and track the device location, previous techniques have made use of information obtained from cellular networks. Each cell in the network is uniquely identified within its location area, network and country by means of Cell Global Identification (CGI). When a mobile phone enters a new location and registers to the base station in that cellular location, it has access to the Mobile Country Code (MCC). Therefore, a mobile phone comprising an FM transmitter is able to determine the region in which it is currently located from the MCC of the local base station.

This method for determining and tracking the device location suffers from several disadvantages. Firstly, it is not possible to locate or track the device in areas without network coverage. If there is no network coverage, then the device is not able to determine its current location and obtain the appropriate FM transmission parameters. This can result in two scenarios: either the user proceeds to transmit data and risks breaching the local regulations, or the FM transmitter is automatically disabled by the device until a network connection has been re-established. This limitation could therefore disadvantage a user wishing to transmit music to the FM receiver in his car stereo while driving through mountainous regions or tunnels.

A further problem may occur when the device is located close to a boundary between two regions that require different FM transmission parameters. If the signal from a base station on the opposite side of the boundary is stronger than the signal from any base station on the same side of the boundary, the device may connect to, and receive location data from, the former. In this situation, the FM transmitter may be configured to use parameters which are not valid for use at the current device location.

Also, modern mobile phones often come with additional features (digital camera, MP3 player, games, GPS etc) which can be operated when the phone is in either active mode or flight mode. Active mode refers to the state when the cellular telecommunications circuitry is enabled for use. In contrast, flight mode refers to the state when the cellular telecommunications circuitry (and other transmission circuitry) is disabled from use, and is most often used onboard aircraft to prevent transmitted signals from interfering with the aircraft avionics and ground cell networks. Flight mode can also be used to reduce power consumption and extend battery life during use of the additional features.

Modern mobile phones also allow a user to access the additional features whether a subscriber identity module (SIM) card is in use or not. Operation of the phone without a SIM card automatically disables the telecommunications circuitry. As with flight mode, this mode of operation can be used to reduce power consumption and extend battery life during use of the additional features. The necessity to connect to a telecommunications network in order to configure an FM transmitter with local transmission parameters therefore reduces this ability to extend battery life.

It should not be automatically assumed that the above-mentioned discussion is knowledge already available in the public domain.

US 2009/0017800 discloses a method for configuring an FM radio transmitter on a portable telecommunications device to automatically cease transmission in countries where unlicensed FM transmission is not permitted. The method uses the current cell ID (or GPS, WLAN or other suitable means) to determine the current location of the device. Once the current location is known, the device accesses a country lookup table to determine whether FM transmission is permitted in the country in which the device is currently located. If transmission is allowed, the FM transmitter remains operational, but if transmission is not allowed, the FM transmitter is disabled from use while the device is within that particular country. This method therefore helps to prevent against illegal operation of FM radio transmitters in portable devices. This document does not disclose a method for configuring an FM radio transmitter on a user-portable device to use valid FM transmission parameters corresponding to the current geographical location.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

According to a first aspect, there is provided a processor for a user-portable device, the user-portable device comprising FM transmission circuitry, wherein the processor is configured to:

- obtain a first set of valid geo-specific FM transmission parameters for the current geographical location of the user-portable device based on received global positioning satellite (GPS) data for the current geographical location of the user-portable device; and
- provide signalling to configure the FM transmission circuitry to use the valid first set of geo-specific FM transmission parameters.

The processor may be further configured to:

- obtain a second set of valid geo-specific FM transmission parameters for a geographical location adjacent the current geographical location when the user-portable device is in the current geographical location; and
- provide signalling to configure the FM transmission circuitry to use the valid second set of geo-specific FM transmission parameters when the user-portable device is in, or crosses a boundary to, the adjacent geographical location.

The user-portable device may comprise cellular telecommunications circuitry to provide for audio/video transmission of data, the user-portable device being configured to have an offline mode in which the cellular telecommunications circuitry is disabled from use, and wherein the processor is configured to receive the GPS data for the current geographical location of the user-portable device when the user-portable device is in the offline mode for use in providing signalling to configure the FM transmission circuitry.

Advantageously, the processor is configured to obtain the first set of valid geo-specific FM transmission parameters based on the received GPS data for the current geographical location of the user-portable device when the user-portable device is in the offline mode.

Offline mode may be specifically selected by the user, or may be the only mode of operation available to the user, for example, if the SIM card has been removed.

The user-portable device may comprise cellular telecommunications circuitry to provide for audio/video transmission of data, the user-portable device being configured to determine whether there is network coverage available for the cellular telecommunications circuitry and, if not, the processor is configured to receive the GPS data for the current geographical location of the user-portable device for use in providing signalling to configure the FM transmission circuitry.

The processor may be configured to obtain the first set of valid geo-specific FM transmission parameters based on the received GPS data for the current geographical location of the user-portable device when there is no network coverage available for the cellular telecommunications circuitry.

If cellular network coverage is available to the user-portable device, the cellular network may be used to determine the current geographical location of the user-portable device instead of GPS. GPS may be used to support the cellular network in determining the current geographical location in the event that the network coverage is subsequently lost.

The processor may be configured to provide signalling to generate a user alert when the FM transmission circuitry has been configured to use the valid second set of geo-specific FM transmission parameters.

The valid set of geo-specific FM transmission parameters may comprise one or more of the following: transmission power output, effective radiated power (ERP), channel spacing, and transmission frequency which is valid for a particular geographical location. Each set of geo-specific FM transmission parameters may be valid within a specific state, country or region.

The FM transmission circuitry may be configured to use the valid second set of geo-specific FM transmission parameters automatically without user interaction when the device has moved to the adjacent geographical location.

Advantageously, the processor may be configured to obtain the valid geo-specific FM transmission parameters from a storage medium located locally on the user-portable device or by communicating with a server remote to the user-portable device. The storage medium may be a temporary storage medium, which could be a volatile random access memory. The storage medium may be a permanent storage medium, wherein the permanent storage medium could be any of the following: a hard disk drive, a flash memory, and a non-volatile random access memory.

The valid geo-specific FM transmission parameters may be sent from the remote server to the user-portable device using wireless communication means, wherein the wireless communication means could be any of the following: a Wi-Fi network, a mobile telephone network, a satellite internet service, or a Worldwide Interoperability for Microwave Access (WiMax) network.

The processor may be a microprocessor, including an Application Specific Integrated Circuit (ASIC).

According to a further aspect, there is provided a user-portable device comprising any processor described herein, the user-portable device further comprising GPS circuitry for providing the GPS data to the processor. The GPS circuitry may be integrated in the user-portable device (i.e. built-in), but could comprise part of a standalone GPS module (i.e. external) capable of being connected to the user-portable device. The standalone GPS module may be configured to connect to the user-portable device via a Bluetooth™ interface. The GPS circuitry may determine the current geographical location autonomously (autonomous mode) or in combination with a cellular network (assisted mode).

The user-portable device may be configured to run a map application, wherein the map application is configured to show the boundary between the current and adjacent geographical locations to a user of the device. The processor or GPS circuitry may be configured to run the map application. The user-portable device may be configured to run an application which determines the boundary using means other than a map. Such an application might use the MCC of the local base station or the identification of the service provider to determine the boundary, for example.

The user-portable device may be configured to run an FM transmission application, the FM transmission application allowing the user to access and control the FM transmission circuitry.

The GPS circuitry may incorporate a time-out feature, wherein if the GPS circuitry is not able to establish a fix within a specified period of time (and is therefore not able to provide the processor with valid GPS data within this specified period of time), one or more of the following are automatically turned off: the GPS circuitry, the map application, the FM transmission circuitry and the FM transmission application.

Advantageously, the user-portable device may be configured to send an interrupt to the processor when the device is in, or crosses the boundary to, the adjacent geographical location, the interrupt instructing the processor to provide signalling to configure the FM transmission circuitry to use the valid second set of geo-specific FM transmission parameters.

The user-portable device may be a portable telecommunications device comprising cellular telecommunications circuitry.

The cellular telecommunications circuitry may be located on a separate microchip from the processor, FM transmission circuitry and GPS circuitry, wherein one or more of the processor, FM transmission circuitry and GPS circuitry can be operated independently of the cellular telecommunications circuitry.

Advantageously, the processor, FM transmission circuitry and GPS circuitry may be located on a single microchip. The FM transmission circuitry may be so-called low power FM circuitry (e.g. with a maximum range of up to 5 m, 10 m, 15 m, 20 m or 25 m).

Whilst the apparatus and method described herein is directed towards a user-portable device comprising FM transmission circuitry, it may be applied to any device which comprises FM transmission circuitry. For example, the processor and FM transmission circuitry could be incorporated into a navigation unit, which may be a hand-held navigation unit or an in-vehicle navigation unit. The in-vehicle navigation unit may be detachable from the vehicle, but could be built into the vehicle and therefore not detachable. Likewise, a laptop or desktop computer may comprise FM transmission circuitry and could further incorporate the processor and GPS circuitry as described herein.

There is also provided, a system comprising any user-portable device described herein, and a network database server for storing geo-specific FM transmission parameters, wherein the processor is configured to obtain the valid first or second set of geo-specific FM transmission parameters from the network database server.

According to a further aspect, there is provided a method for configuring a user-portable device to use FM transmission circuitry, the method comprising:

- obtaining a first set of valid geo-specific FM transmission parameters for the current geographical location of the user-portable device based on received global positioning satellite (GPS) data for the current geographical location of the user-portable device; and
- providing signalling to configure the FM transmission circuitry to use the valid first set of geo-specific FM transmission parameters.

The method may further comprise:

- obtaining a second set of valid geo-specific FM transmission parameters for a geographical location adjacent the current geographical location when the user-portable device is in the current geographical location; and
- providing signalling to configure the FM transmission circuitry to use the valid second set of geo-specific FM transmission parameters when the user-portable device is in, or crosses a boundary to, the adjacent geographical location.

There is also provided a computer program recorded on a carrier, the computer program comprising computer code configured to operate a user-portable device, the user-portable device comprising FM transmission circuitry, and wherein the computer program comprises:

- code for obtaining a first set of valid geo-specific FM transmission parameters for the current geographical location of the user-portable device based on received global positioning satellite (GPS) data for the current geographical location of the user-portable device; and
- code for providing signalling to configure the FM transmission circuitry to use the valid first set of geo-specific FM transmission parameters.

The computer program may further comprise:

- code for obtaining a second set of valid geo-specific FM transmission parameters for a geographical location adjacent the current geographical location when the user-portable device is in the current geographical location; and
- code for providing signalling to configure the FM transmission circuitry to use the valid second set of geo-specific FM transmission parameters when the user-portable device is in, or crosses a boundary to, the adjacent geographical location.

According to a further aspect, there is provided a processor for a device, the device comprising FM transmission circuitry, wherein the processor is configured to:

- obtain a first set of valid geo-specific FM transmission parameters for the current geographical location of the device based on received wireless local area network (WLAN)-derived location data for the current geographical location of the device; and
- provide signalling to configure the FM transmission circuitry to use the valid first set of geo-specific FM transmission parameters.

The device may be a navigation unit, which may be a hand-held navigation unit or an in-vehicle navigation unit.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:—

DESCRIPTION OF SPECIFIC ASPECTS/EMBODIMENTS

Figure 1:
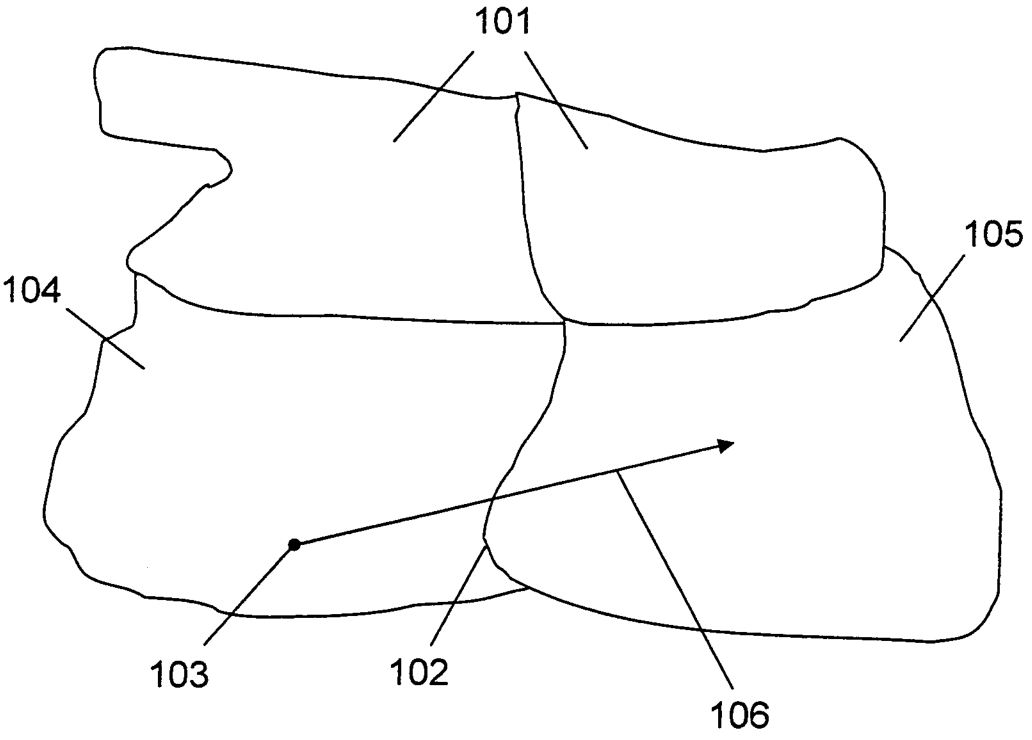
FIG. 1 illustrates schematically a method for configuring a user-portable device to use FM transmission circuitry.

Referring to FIG. 1, there is illustrated a method for configuring a user-portable device to use FM transmission circuitry. In this figure, a geographical region is divided into four sub-regions 101, 104, 105 the sub-regions 101, 104, 105 separated by (e.g. virtual/physical/geographical/political) boundaries 102. In each of the sub-regions 101, 104, 105, the FM transmission requirements are different. When the FM transmission circuitry located in sub-region 104 is first switched on, the user-portable device determines its current geographical location 103 using Global Positioning Satellites (GPS).

GPS systems implemented in mobile phones are capable of operating in both autonomous mode and assisted mode, and the GPS operation takes place in two stages—acquisition and tracking. Acquisition in autonomous mode requires at least four satellites to make an initial fix from cold (cold fix), and may take up to 30 seconds or longer. In assisted mode, acquisition is aided using information from a mobile base station so that a fix can be achieved faster. In assisted mode, the fix may be achieved using partial (warm fix) or full (hot fix) information from the base station. Once a fix has been achieved, the position of the phone can be accurately tracked for up to 4 hours without the need to obtain another fix.

The user-portable device may be configured to determine its current geographic location 103 using GPS on its own (autonomous mode), or in combination with a cellular network (assisted mode).

Once the current geographical location 103 has been determined, the user-portable device then obtains a valid first set of FM transmission parameters for the current geographical location 103 in order to comply with the local transmission regulations. The transmission parameters may include transmission output power, effective radiated power (ERP), channel spacing, and transmission frequency, and may be valid within a specific state, country or region. In the present example, the first set of parameters are valid only within sub-region 104, but in other examples, the parameters may be valid across more than one sub-region.

The FM transmission parameters may be obtained from a storage medium located locally on the user-portable device. Alternatively, the FM transmission parameters may be obtained by communicating wirelessly with a database server remote to the user-portable device. Once the valid first set of transmission parameters have been obtained, the device configures the FM transmission circuitry to use the parameters. The FM transmission circuitry is configured to use the first set of transmission parameters for as long as the device is located within the state, country or region 104 in which the parameters are applicable.

Figure 2:
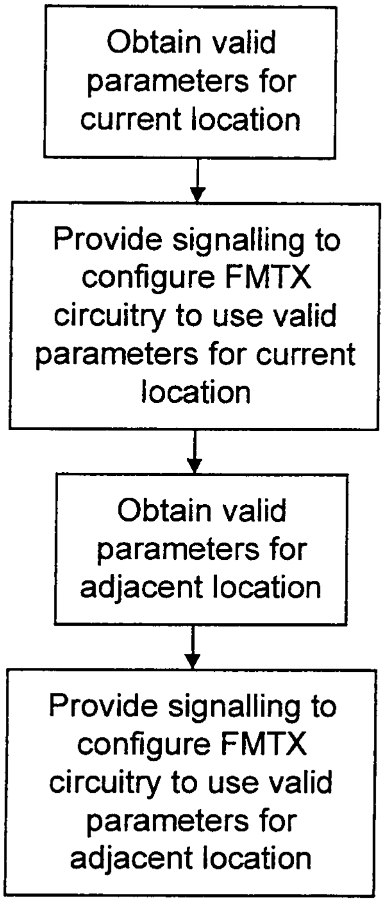
FIG. 2 identifies the key steps involved in carrying out the method of FIG. 1.

The location of the user-portable device is then continually/intermittently tracked 106 using GPS to ensure that the local transmission regulations are adhered to when the device moves from the current geographic location 103. This is necessary, because the device may cross a boundary 102 from a first region 104 in which the first set of transmission parameters are valid, to a second region 105 in which the first set of transmission parameters are not valid. When a boundary 102 is crossed, the device obtains a second set of FM transmission parameters which are valid within the second region 105. Again, the parameters may be obtained from a storage medium located on the user-portable device, or by communicating wirelessly with a remote database server. Once obtained, the FM transmission apparatus is then reconfigured to operate using the second set of parameters. FIG. 2 identifies the key steps of the method described above.

For user-portable devices with limited storage space, it may be possible to store only a single set of FM transmission parameters. In this scenario, the user-portable device obtains the parameters for the first region 104 from the remote database server when the FM transmission circuitry is switched on. When the device later crosses a boundary 102 into an adjacent region 105 with different transmission requirements, a new set of parameters are obtained from the remote server and used to replace the previously stored parameters. To allow sufficient time for receiving the parameters, the user-portable device queries the database server for the required parameters and obtains them before entering the adjacent region 105.

As discussed previously, locating and tracking the user-portable device using a cellular network has its disadvantages. In the present invention, Global Position Satellite (GPS) data may be used instead. GPS allows the user-portable device to be located and tracked anywhere in the world without the need for cellular network coverage. In effect, this enables valid transmission parameters to be obtained and used by the FM transmission circuitry, thereby preventing illegal operation.

Furthermore, if the satellite signal is lost, say because the user-portable device enters a tunnel, GPS can approximate the current location of the device using the speed and direction of travel before the signal was lost. This is not possible using a cellular network, the connection to which must be re-established on exiting the tunnel.

Also, with GPS, the above-mentioned problem associated with the user-portable device receiving location data from a base station on the opposite side of a boundary is avoided. This prevents the FM transmission circuitry from being configured to use invalid transmission parameters.

In addition, without the necessity to connect to a cellular network, the FM transmission circuitry may be operated when the phone is in offline mode. Offline mode refers to the low power state in which the cellular telecommunications circuitry is disabled from use. This enables power consumption to be reduced, resulting in an increase in battery life for the user-portable device. Offline mode may be specifically selected by the user, or may be the only mode of operation available to the user, for example, if the SIM card has been removed. Importantly, offline mode is distinguished from flight mode in that offline mode allows the FM transmission circuitry to be operated, whilst flight mode prevents all transmission and therefore disables both the telecommunications circuitry and the FM transmission circuitry. To conform with current airline safety requirements, flight mode may still be incorporated, however.

While the advantages of not having to rely on a cellular network for FM transmission compliance have been discussed, use of a cellular network is not necessarily excluded from the apparatus and method described herein. As mentioned previously, GPS acquisition in assisted mode requires information from a mobile base station in order to obtain a fix. Therefore, in this mode, both GPS and the cellular network are required for transmission compliance. Furthermore, if the user-portable device is already connected to a cellular network, then the user of the device may prefer to use the network to obtain the current geographical location rather than switching on the GPS circuitry. In this situation, GPS may be used to support the cellular network in determining the current geographical location in the event that the network coverage is subsequently lost.

As GPS is currently available in many portable telecommunication devices, this feature may be implemented without requiring substantial modifications to the existing hardware or software.

Figure 3:
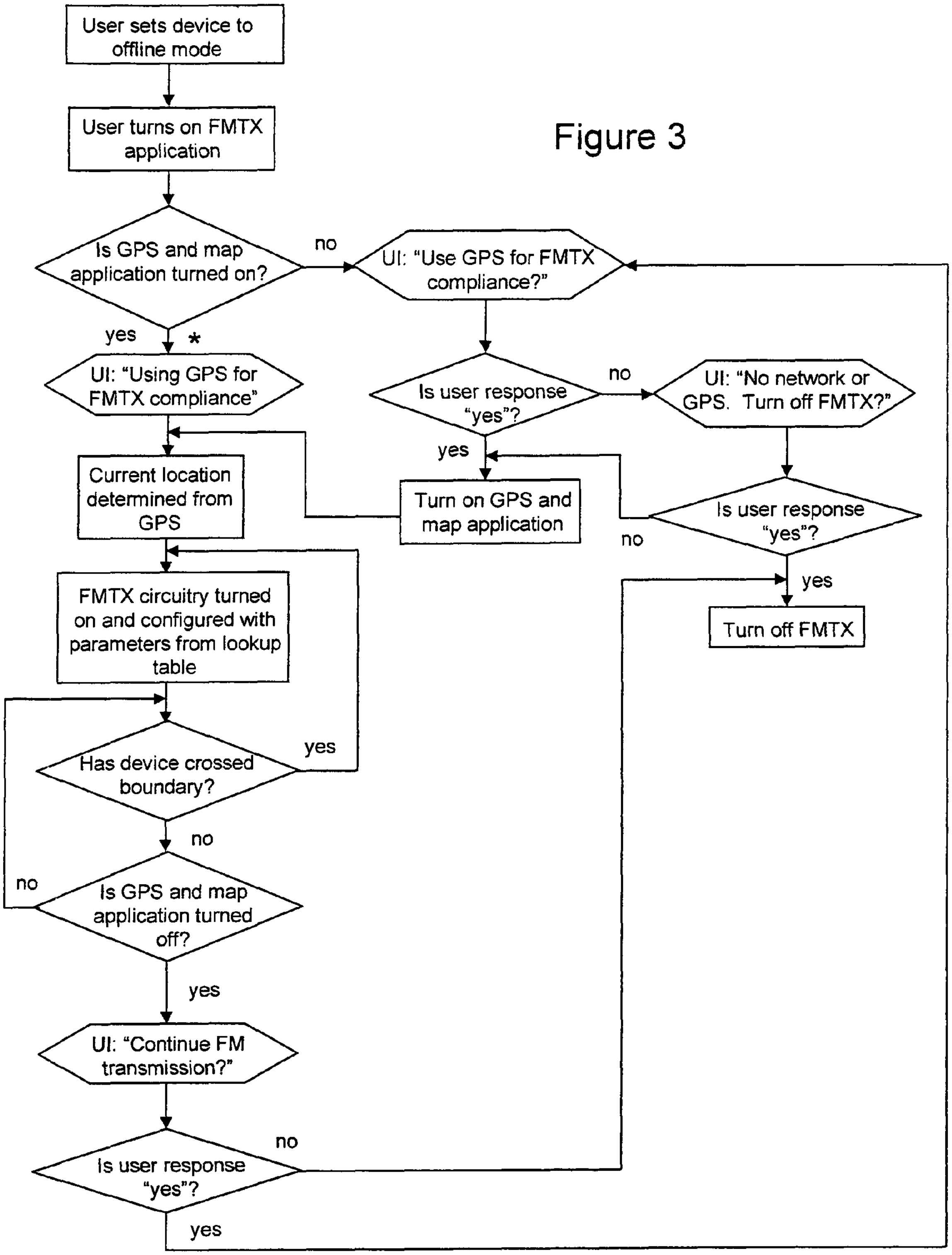
FIG. 3 is a flow chart illustrating a first implementation of the method of FIG. 1.

FIG. 3 illustrates a first embodiment in which a portable telecommunications device is configured to use FM transmission circuitry in offline mode. The device (or possibly the processor or GPS circuitry) is configured to run a map application when the GPS circuitry is switched on, wherein the map application is arranged to show the boundary between the current and adjacent geographical locations to the user of the device. Once the device has been placed in the offline mode, the user turns on an FM transmission application. It should be noted that turning on the FM transmission application does not necessarily turn on the FM transmission circuitry automatically. At this point, the processor of the device determines whether the GPS circuitry and map application are turned on.

If the GPS circuitry and map application are turned on, the processor attempts to receive valid GPS data for the current geographical location. Here, "valid GPS data" refers to accurate, up-to-date location data corresponding to the actual geographical location of the device. If valid GPS data are not immediately available, say because the GPS circuitry cannot get a fix, the processor will wait for valid GPS data to become available until a specified timeout period is reached. If valid GPS data does not become available within the timeout period, the FM transmission application is automatically turned off. On the other hand, if valid GPS data are available, the user interface of the device displays the message "Using GPS for FMTX compliance" and the processor obtains a first set of valid geo-specific FM transmission parameters for the current geographical location from a lookup table stored in the device memory or on the remote database server. To prevent the flowcharts of FIGS. 3 and 4 from being overcrowded, it has been assumed that valid GPS data is available for determination of the current geographical location. As a result, the GPS timeout feature has not been included in the flowcharts. Instead, an asterisk has been used to indicate where this step would appear in the process.

After obtaining the valid parameters, the processor provides signalling to turn on the FM transmission circuitry and configure the FM transmission circuitry to use these parameters. While the GPS circuitry and map application are turned on, any movement of the device is continuously/intermittently tracked on a digital map. If the device crosses a boundary between regions with different transmission requirements, the device sends an interrupt to the processor instructing the processor to obtain parameters for the new geographical location and to provide signalling to reconfigure the FM transmission circuitry to use these new parameters.

If the GPS circuitry and map application are turned off after the FM transmission circuitry has been initially configured, the user interface displays the prompt "Continue FM transmission?". If the user decides not to continue FM transmission, the FM transmission circuitry and application are turned off. Alternatively, if the user wishes to continue FM transmission, he has the option of using the GPS circuitry and map application for compliance with the local transmission regulations as before, otherwise the FM transmission circuitry and application are turned off. Similarly, if the GPS circuitry and map application are not already on when the FM transmission circuitry is initially turned on, the user interface will display the message "Use GPS for FMTX compliance?", prompting the user the make a decision on whether or not to use the FM transmission circuitry in combination with the GPS circuitry and map application.

Figure 4:
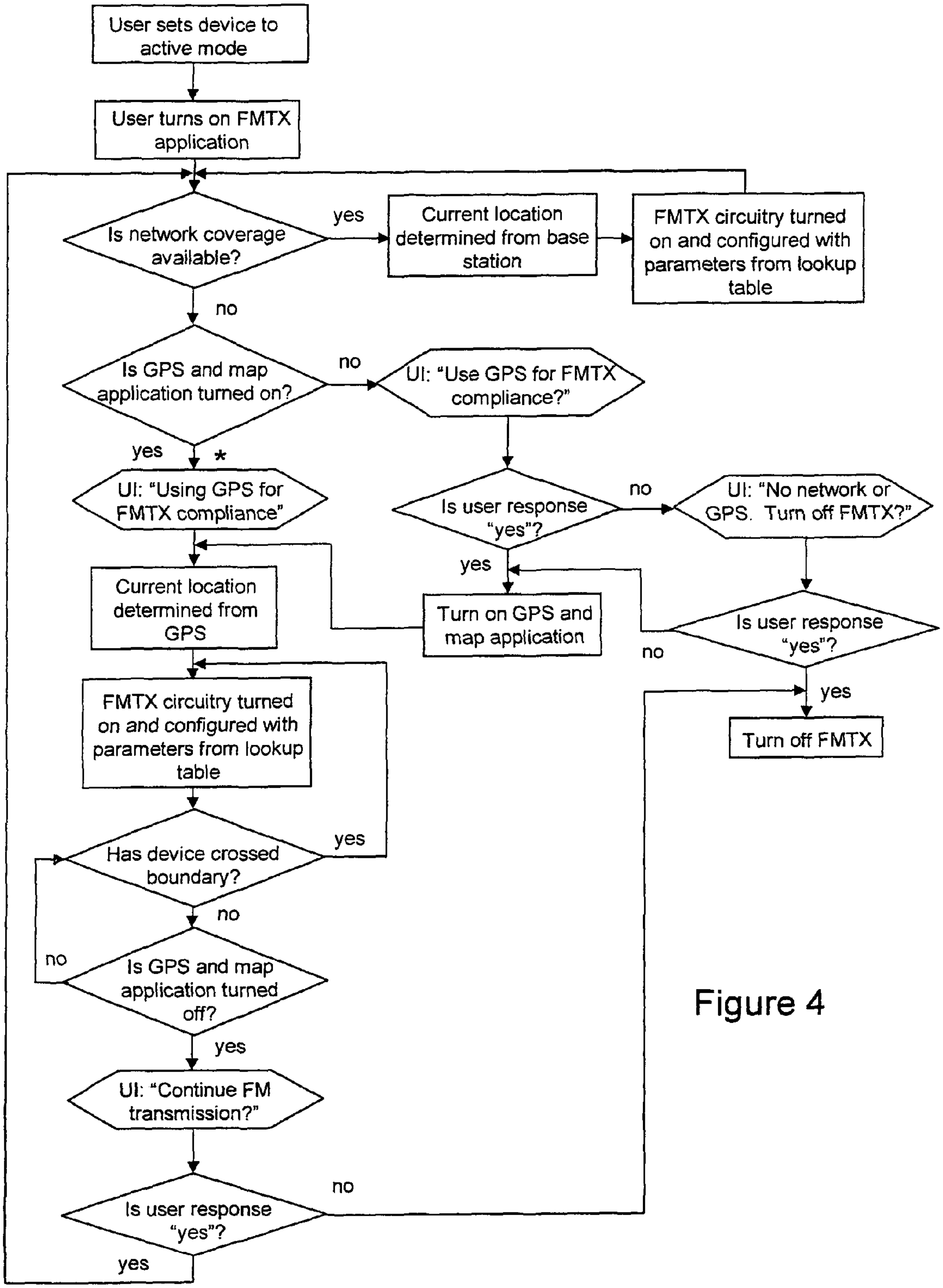
FIG. 4 is a flow chart illustrating a second implementation of the method of FIG. 1.

FIG. 4 illustrates a second embodiment in which the portable telecommunications device is configured to use FM transmission circuitry in the active mode. In this embodiment, GPS is used in combination with a cellular telecommunications network to provide support when the cellular network is not able to provide location data. When network coverage is available, the current geographical location is determined from the base station to which the device is connected. Using this location data, the processor then obtains the set of valid transmission parameters from the lookup table and provides signalling to configure the FM transmission circuitry to use the valid parameters. The device location is monitored thereafter using the Mobile Country Codes (MCC) obtained from whatever base station the device is connected to.

When network coverage is not available, however, the processor determines whether or not the GPS circuitry and map application are turned on. If the GPS circuitry and map application are turned on, and valid GPS data are available, the current location is determined and the FM transmission circuitry is turned on and configured as described with reference to FIG. 3. If the GPS circuitry and map application are not turned on, the user has the option to use GPS for transmission compliance, otherwise the FM transmission circuitry and application are turned off. If the GPS circuitry and map application are turned off after the FM transmission circuitry has been initially configured, the user interface displays the prompt "Continue FM transmission?" as before. If the user decides not to continue FM transmission, the FM transmission circuitry and application are turned off. Alternatively, if the user wishes to continue FM transmission, the device searches for network coverage and the process begins again.

Figure 5:
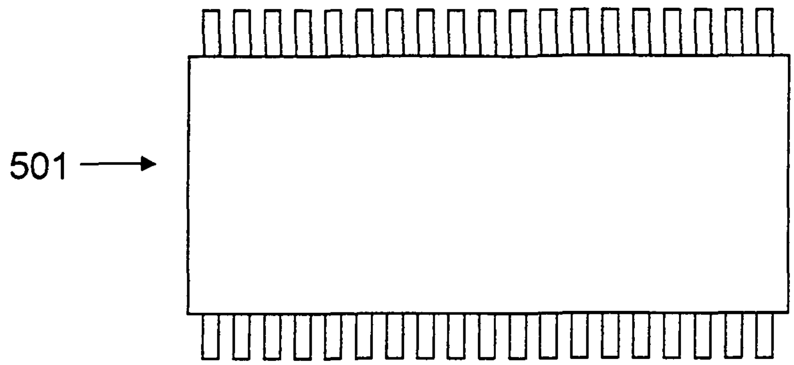
FIG. 5 illustrates schematically a processor for a device.

The apparatus required to perform the above methods will now be described. In FIG. 5 there is illustrated a processor 501 for the user-portable device, which may be a microprocessor including an Application Specific Integrated Circuit (ASIC). With reference to FIGS. 1 and 2, the processor 501 is configured to obtain a first set of FM transmission parameters for the current geographical location 103 based on received GPS data, and provide signalling to configure the FM transmission circuitry to use the first set of parameters. The first set of parameters are valid within the first region 104. When the user-portable device moves from the current geographical location 103 to an adjacent geographical location, the processor 501 obtains a second set of FM transmission parameters for the adjacent geographical location, again based on received GPS data. After obtaining the second set of parameters, the processor 501 provides signalling to configure the FM transmission circuitry to use the second set of parameters. The second set of parameters are valid within the second region 105. The processor 501 may be configured to provide signalling to generate a user alert when the FM transmission circuitry has been configured to use the valid second set of FM transmission parameters. This informs the user that new transmission parameters have been applied in case there is any noticeable deterioration in reception as a result of the different settings. The user may then choose to position the device closer to the radio receiver to improve reception.

With reference to FIGS. 3 and 4, the processor 501 performs the steps of receiving GPS data, obtaining valid transmission parameters and providing signalling to configure the FM transmission apparatus to use the parameters, when the user-portable device is in both the offline (FIG. 3) and active (FIG. 4) modes. In addition, the processor 501 is used to generate the user interface messages and prompts, and determine whether each of the FM transmission circuitry, GPS circuitry and cellular telecommunications circuitry are turned on or off. Furthermore, when the user response to the prompt “Use GPS for FMTX compliance?” is “yes”, the processor 501 is responsible for turning the GPS circuitry and map application on. Likewise, when the user response to the prompts “No network or GPS. Turn off FMTX?” and “Continue FM transmission?” is “yes” and “no”, respectively, the processor 501 is responsible for turning the FM transmission circuitry off. When the device is being operated in active mode, the processor 501 may also be used in determining whether or not there is any network coverage.

Figure 6:
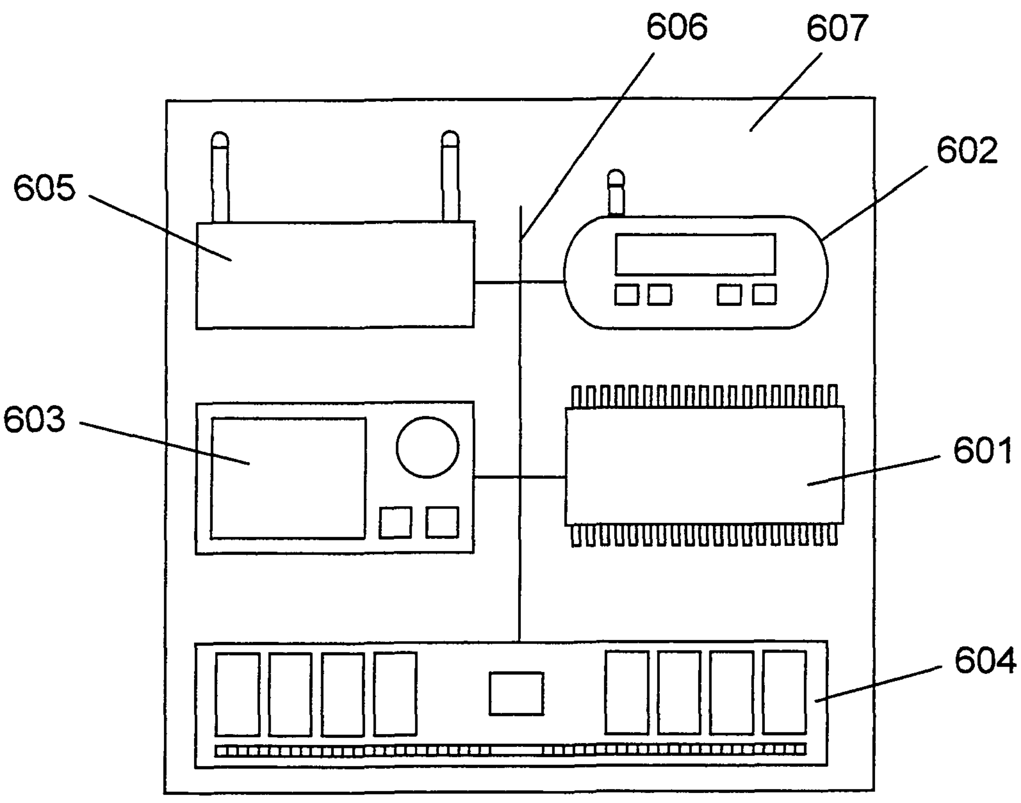
FIG. 6 illustrates schematically a device comprising a processor.

In FIG. 6 there is illustrated a user-portable device 607 comprising a processor 601, FM transmission circuitry 602, GPS circuitry, a storage medium 604 and a transceiver 605, which may be electrically connected to one another by a data bus 606. The processor 601 is as described with reference to FIG. 5.

The FM transmission circuitry 602 is configured to use the valid first and second sets of transmission parameters in response to signalling provided by the processor 601. The FM transmission circuitry 602 may be configured to use the valid second set of parameters automatically without user interaction when the user-portable device 607 has moved into the adjacent geographical location 105.

As described previously, the GPS circuitry 603 is configured to locate and track the user-portable device 607, and provide data corresponding to the device location to the processor 601. The GPS circuitry 603 may be used when the device 607 is in the offline or active modes. In the offline mode, the GPS circuitry 603 is used to determine the geographical location instead of a cellular network. In the active mode, however, the GPS circuitry 603 may be used to support the cellular network by determining the geographical location when there is no network coverage or the connection to the cellular network has been lost. The GPS circuitry 603 may be integrated in the user-portable device 607 (i.e. built-in to the device) or may comprise part of a standalone GPS module (i.e. external to the device) capable of being connected to the user-portable device 607. A standalone GPS module may connect to the user-portable device 607 via a Bluetooth™ interface. The GPS circuitry 603 may be configured to run the map application described previously.

The storage medium 604 is used to store the FM transmission parameters for use by the FM transmission circuitry 605. The storage medium 604 may be a temporary storage medium such as a volatile random access memory, or may be a permanent storage medium such as a hard disk drive, a flash memory or a non-volatile random access memory. In addition, the storage medium 604 might store the valid parameter sets for every state, country and region, or may only store the parameter sets for some. This may be dictated by the amount of storage space or memory available on the device 607. Ideally, the parameters are stored in the form of a lookup table, wherein the parameters are arranged into states, countries or regions. This arrangement allows the processor 601 to obtain the relevant set of parameters quickly.

Figure 8:
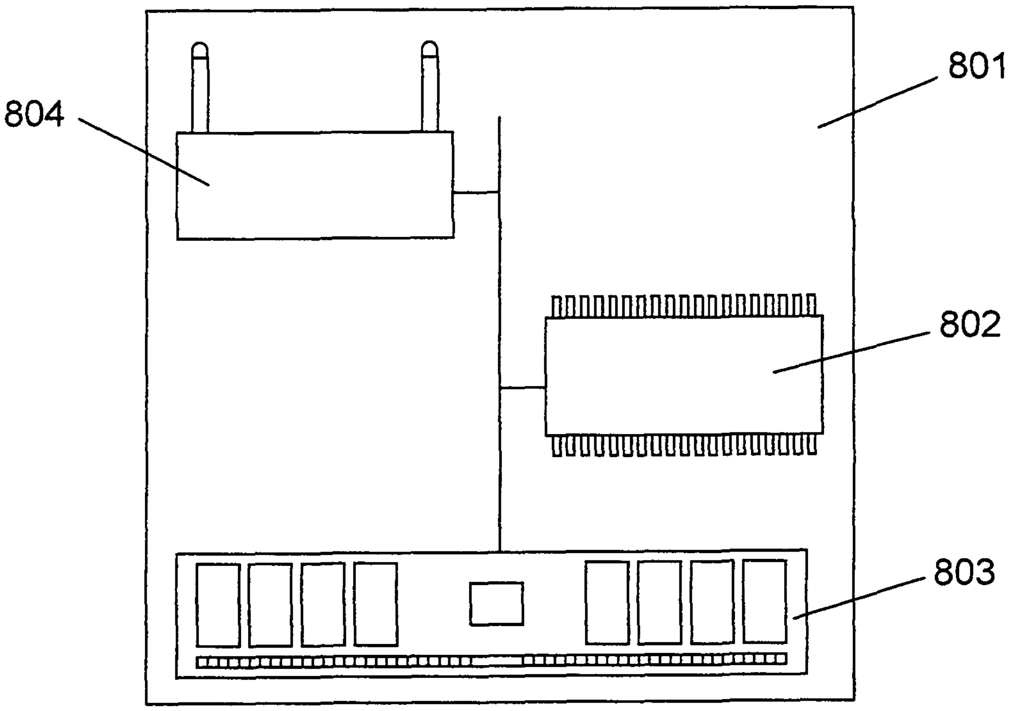
FIG. 8 illustrates schematically a database server.

When the FM transmission parameters are not stored at the device, the device 607 may retrieve the parameters from a remote database server 801 (FIG. 8). The use of a database server 801 is particularly important when the user-portable device 607 has a limited amount of storage space and cannot store the valid transmission parameters for every state, country or region. Where the parameters need to be obtained from a database server, both the user-portable device 607 and the database server 801 will comprise a transmitter and receiver (or a transceiver 605, 804) for sending and receiving data. In this embodiment, the FM transmission parameters may be sent from the remote database server 801 to the user-portable device 607 over a cellular network, a Wi-Fi network, a satellite internet service, or a Worldwide Interoperability for Microwave Access (WiMax) network.

Where the user-portable device 607 is a portable telecommunications device, the user-portable device will also comprise cellular telecommunications circuitry. The cellular telecommunications circuitry may be located on a separate microchip from the processor 601, FM transmission circuitry 602 and GPS circuitry 603, wherein one or more of the processor 601, FM transmission circuitry 602 and GPS circuitry 603 can be operated independently of the cellular telecommunications circuitry. The processor 601, FM transmission circuitry 602 and GPS circuitry 603 may be located on a single microchip.

This configuration allows power to be supplied to the microchip containing the processor 601, FM transmission circuitry 602 and GPS circuitry 603 and not to the (e.g. separate) microchip containing the cellular telecommunications circuitry, thereby facilitating FM transmission in offline mode. This has the advantage of reducing power consumption, resulting in an increase in battery life for the user-portable device 607.

Figure 7:
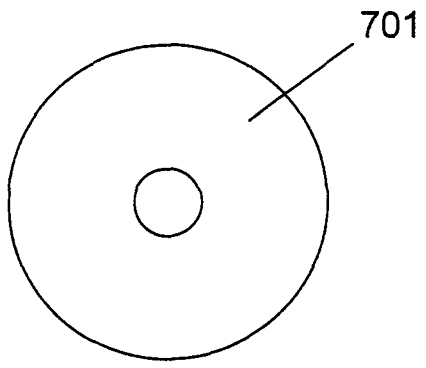
FIG. 7 illustrates schematically a computer readable media providing a program.

FIG. 7 illustrates schematically a computer/processor readable media 701 providing a computer program according to one embodiment. In this example, the computer/processor readable media 701 is a disc such as a digital versatile disc (DVD) or a compact disc (CD). In other embodiments, the computer readable media 701 may be any media that has been programmed in such a way as to carry out an inventive function.

With reference to FIGS. 2 and 3, the computer program may comprise code for obtaining a first set of valid geo-specific FM transmission parameters for the current geographical location 103 of the user-portable device based on received global positioning satellite (GPS) data for the current geographical location of the user-portable device 607, and code for providing signalling to configure the FM transmission circuitry to use the valid first set of geo-specific FM transmission parameters. The computer program may also contain code for obtaining a second set of valid geo-specific FM transmission parameters for a geographical location 105 adjacent the current geographical location 104 when the user-portable device is in the current geographical location 104, and code for providing signalling to configure the FM transmission circuitry 602 to use the valid second set of geo-specific FM transmission parameters when the user-portable device is in, or crosses a boundary 102 to, the adjacent geographical location 105.

In FIG. 8 there is illustrated schematically a database server 801. The database server 801 may be situated at a location remote to the device 607 and may host a database of geo-specific FM transmission parameters which the user-portable device 607 can access to obtain the parameters corresponding to its geographical location. The database server comprises a processor 802, a storage medium 803 and a transceiver 804, and may be configured to receive location data from the device 607 and send FM transmission data to the device 607. The database server may form part of a network.

Figure 9:
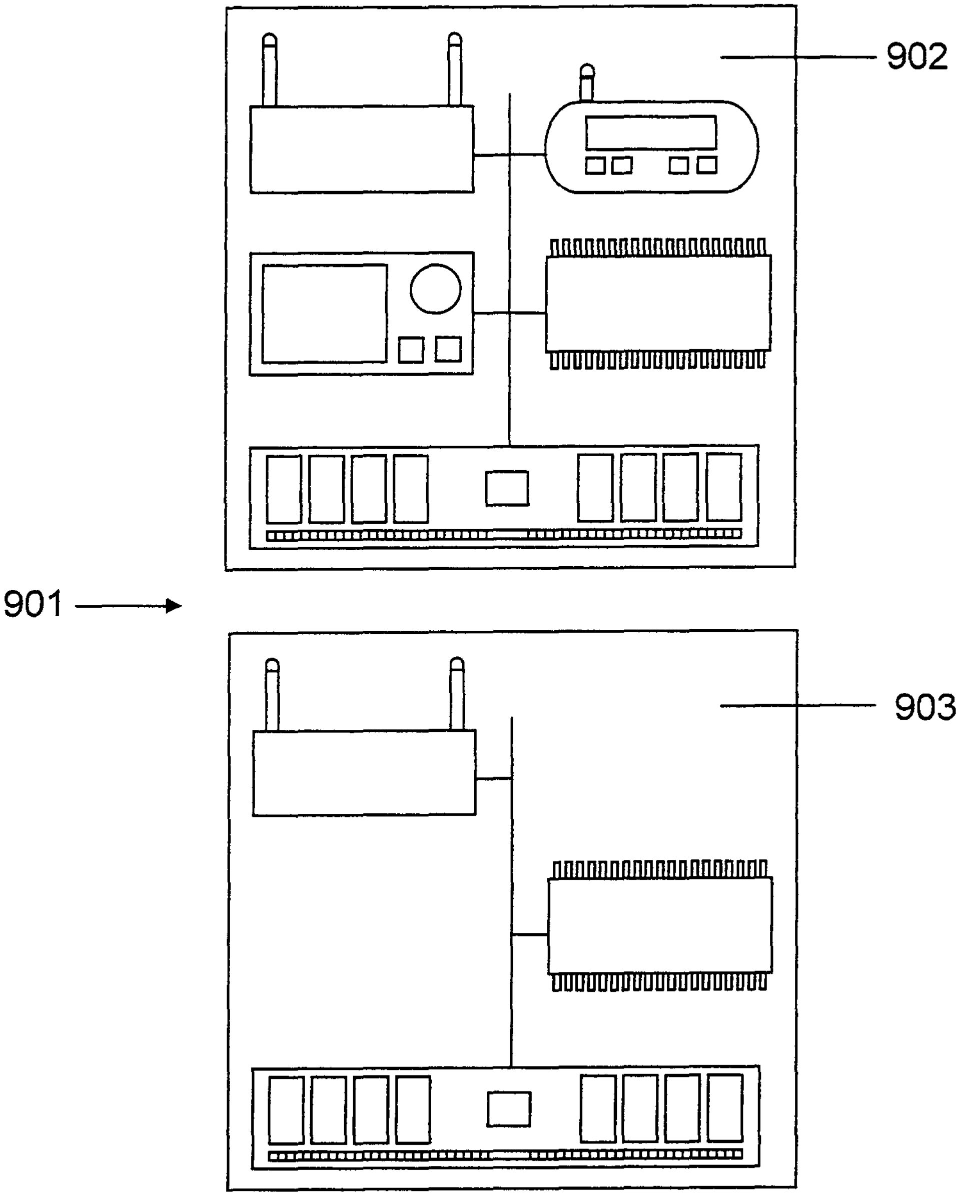
FIG. 9 illustrates schematically a system comprising a device and a database server.

In FIG. 9 there is illustrated schematically a system 901 comprising a device 902 and a database server 903. The device is as described with reference to FIG. 6 and the database server is as described with reference to FIG. 8.

Other embodiments depicted in the figures have been provided with reference numerals that correspond to similar features of earlier described embodiments. For example, feature number 1 may also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus, comprising:

at least one processor;

at least one memory including computer program code;

the at least one memory and the computer program code configured to, with the at least one processor, cause the apparatus at least to:

obtain a first set of valid geo-specific FM transmission parameters for a current geographical location of a user-portable device based on received global positioning satellite (GPS) data for the current geographical location of the user-portable device;

provide signalling to configure an FM transmission circuitry to use the valid first set of geo-specific FM transmission parameters;

determine a boundary between the current geographical location and a geographical location adjacent the current geographical location;

obtain a second set of valid geo-specific FM transmission parameters for the geographical location adjacent the current geographical location while the user-portable device is in the current geographical location;

track motion of the user-portable device while the user-portable device is in the current geographical location; and automatically provide signalling in response to the tracking the motion of the user-portable device, to configure the FM transmission circuitry to use the valid second set of geo-specific FM transmission parameters when the user-portable device is in, or crosses the boundary to, the adjacent geographical location.

2. The apparatus according to claim 1, wherein the user-portable device comprises cellular telecommunications circuitry to provide for audio/video transmission of data, the user-portable device being configured to have an offline mode in which the cellular telecommunications circuitry is disabled from use, and wherein the processor is configured to receive the GPS data for the current geographical location, wherein the processor is configured to obtain the first set of valid geo-specific FM transmission parameters of the user-portable device when the user-portable device is in the offline mode for use in providing signalling to configure the FM transmission circuitry.

3. The apparatus according to claim 1, wherein the valid set of geo-specific FM transmission parameters comprises one or more of the following: transmission power output, effective radiated power (ERP), channel spacing, and transmission frequency which is valid for a particular geographical location.

4. The apparatus according to claim 1, wherein the FM transmission circuitry is configured to use the valid second set of geo-specific FM transmission parameters automatically without user interaction when the device has moved to the adjacent geographical location.

5. The apparatus according to claim 3, wherein the processor is configured to obtain the valid geo-specific FM transmission parameters from a storage medium located locally on the user-portable device or by communicating with a server remote to the user-portable device.

6. The apparatus for user-portable device according to claim 4, wherein the user-portable device is configured to run a map application, and wherein the map application is configured to show the boundary between the current and adjacent geographical locations to a user of the device.

7. The apparatus for user-portable device according to claim 4, wherein the user-portable device is configured to send an interrupt to the processor when the device is in, or crosses the boundary to, the adjacent geographical location, the interrupt instructing the processor to provide signalling to configure the FM transmission circuitry to use the valid second set of geo-specific FM transmission parameters.

8. A system comprising the apparatus according to claim 5, and a network database server for storing geo-specific FM transmission parameters, wherein the processor is configured to obtain the valid first or second set of geo-specific FM transmission parameters from the network database server.

9. A method for configuring a user-portable device to use FM transmission circuitry, the method comprising:

obtaining a first set of valid geo-specific FM transmission parameters for the current geographical location of the user-portable device based on received global positioning satellite (GPS) data for the current geographical location of the user-portable device;

providing signalling to configure an FM transmission circuitry to use the valid first set of geo-specific FM transmission parameters;

determining a boundary between the current geographical location and a geographical location adjacent the current geographical location;

obtaining a second set of valid geo-specific FM transmission parameters for the geographical location adjacent the current geographical location while the user-portable device is in the current geographical location;

tracking motion of the user-portable device while the user-portable device is in the current geographical location; and automatically providing signalling in response to the tracking the motion of the user-portable device, to configure the FM transmission circuitry to use the valid second set of geo-specific FM transmission parameters when the user-portable device is in, or crosses the boundary to, the adjacent geographical location.

10. A computer program recorded on a computer readable non-transitory medium, the computer program comprising computer code configured to operate a user-portable device, the user-portable device comprising FM transmission circuitry, and wherein the computer program comprises:

code for obtaining a first set of valid geo-specific FM transmission parameters for the current geographical location of the user-portable device based on received global positioning satellite (GPS) data for the current geographical location of the user-portable device;

code for providing signalling to configure an FM transmission circuitry to use the valid first set of geo-specific FM transmission parameters;

code for determining a boundary between the current geographical location and a geographical location adjacent the current geographical location;

code for obtaining a second set of valid geo-specific FM transmission parameters for the geographical location adjacent the current geographical location while the user-portable device is in the current geographical location;

code for tracking motion of the user-portable device while the user-portable device is in the current geographical location; and code for automatically providing signalling in response to the tracking the motion of the user-portable device, to configure the FM transmission circuitry to use the valid second set of geo-specific FM transmission parameters when the user-portable device is in, or crosses the boundary to, the adjacent geographical location.

11. A processor for a device, the device comprising FM transmission circuitry, wherein the processor is configured to:

obtain a first set of valid geo-specific FM transmission parameters for the current geographical location of the device based on received wireless local area network (WLAN)-derived location data for the current geographical location of the device;

provide signalling to configure an FM transmission circuitry to use the valid first set of geo-specific FM transmission parameters;

determine a boundary between the current geographical location and a geographical location adjacent the current geographical location;

obtain a second set of valid geo-specific FM transmission parameters for the geographical location adjacent the current geographical location while the user-portable device is in the current geographical location;

track motion of the user-portable device while the user-portable device is in the current geographical location; and automatically provide signalling in response to the tracking the motion of the user-portable device, to configure the FM transmission circuitry to use the valid second set of geo-specific FM transmission parameters when the user-portable device is in, or crosses the boundary to, the adjacent geographical location.

* * * * *